(12) United States Patent
Kumata

(10) Patent No.: US 7,145,365 B2
(45) Date of Patent: Dec. 5, 2006

(54) LOGIC PROCESSING APPARATUS, SEMICONDUCTOR DEVICE AND LOGIC CIRCUIT

(75) Inventor: Ichiro Kumata, Kanagawa (JP)

(73) Assignee: Sony Corporation, Tokyo (JP)

(*) Notice: Subject to any disclaimer, the term of this patent is extended or adjusted under 35 U.S.C. 154(b) by 102 days.

(21) Appl. No.: 10/916,539

(22) Filed: Aug. 12, 2004

(65) Prior Publication Data
US 2005/0040859 A1   Feb. 24, 2005

(30) Foreign Application Priority Data
Aug. 18, 2003   (JP) ............................. 2003-294579

(51) Int. Cl.
*H03K 19/00* (2006.01)

(52) U.S. Cl. ............................. 326/93; 326/95; 326/98; 327/201; 327/203

(58) Field of Classification Search .................. 326/95, 326/98; 327/201–203
See application file for complete search history.

(56) References Cited

U.S. PATENT DOCUMENTS

| | | | | |
|---|---|---|---|---|
| 5,646,555 A * | 7/1997 | Morinaka | ..................... | 326/93 |
| 6,452,421 B1 * | 9/2002 | Saito | ............................ | 326/93 |
| 6,459,302 B1 * | 10/2002 | Nakaizumi | .................... | 326/97 |
| 6,788,109 B1 * | 9/2004 | Kitagawa | ..................... | 326/93 |
| 6,788,110 B1 * | 9/2004 | Endo | ............................ | 326/93 |

* cited by examiner

*Primary Examiner*—Vibol Tan
(74) *Attorney, Agent, or Firm*—Oblon, Spivak, McClelland, Maier & Neustadt, P.C.

(57) ABSTRACT

Off-leak electric current is reduced in the operation mode where a circuit is actually operating.

In the state in which the power supply voltage is constantly applied to the front stage flip-flops 11 to 13 and rear stage flip-flops 21 to 23, for example, data held in the flip-flops 11 to 13 at rising of the clock signal CK is processed in a logic gate circuit network 31 to which the supply voltage is applied during a low level period of the clock signal CK, and then, the processed data is held in the flip-flops 21 to 23. In the case where the power supply time to the logic gate circuit network 31 is set to minimum, off-leak electric current of the logic gate circuit network 31 can be reduced.

3 Claims, 9 Drawing Sheets

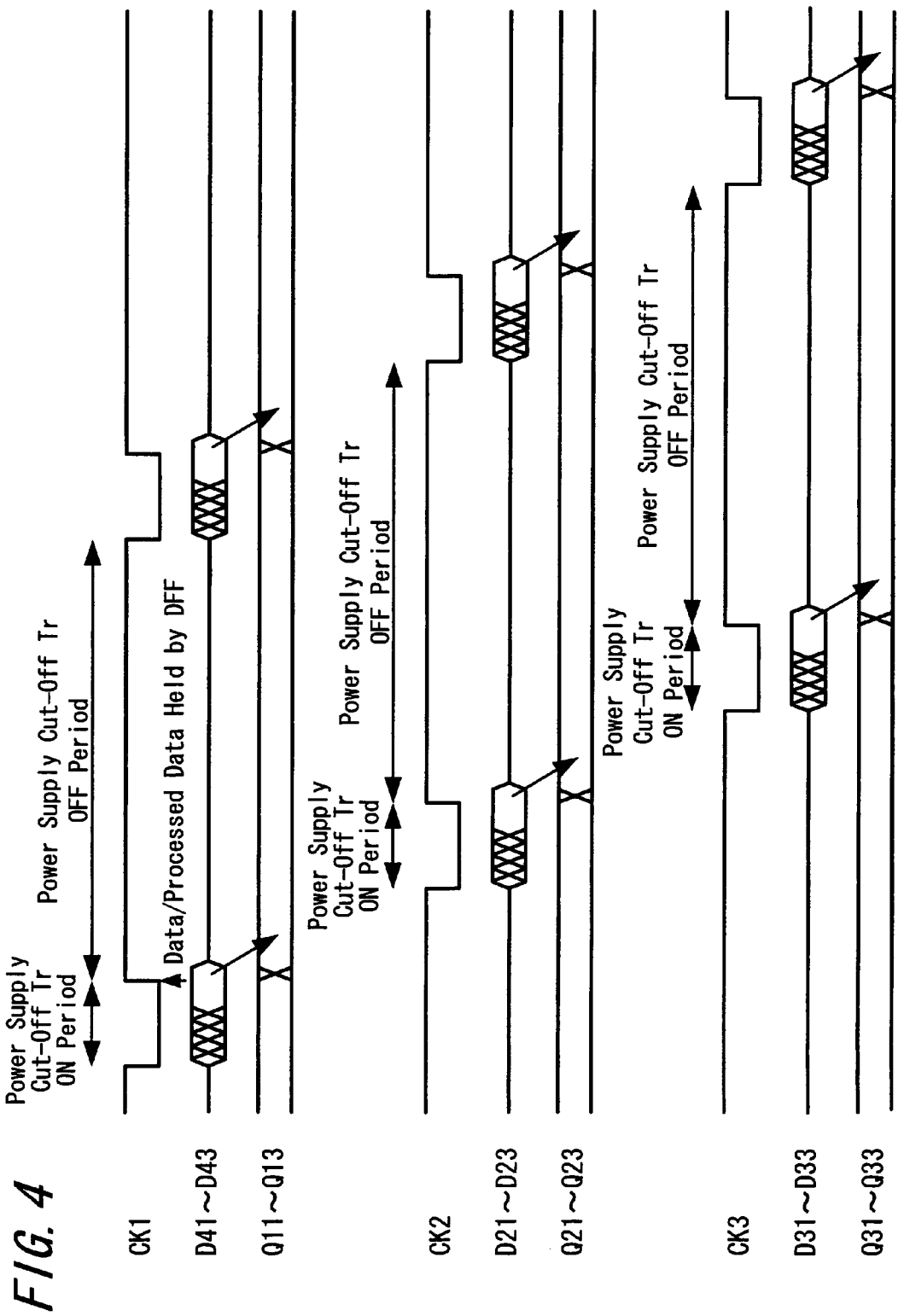

LOGIC PROCESSING APPARATUS, SEMICONDUCTOR DEVICE AND LOGIC CIRCUIT

BACKGROUND OF THE INVENTION

1. Field of the Invention

The present invention relates to a logic processing apparatus including a semiconductor device as a component that has a chip sealed in a package, on which a logic circuit is mounted where data held in the front stage flip-flop is processed at a logic gate circuit network, and then, processed data is held in the rear stage flip-flop; particularly relates to the logic circuit in which an off-leak electric current can be reduced at the logic gate circuit network; and further relates to the semiconductor device.

2. Description of the Related Art

Recently, lower power consumption by, for example, LSI itself has been in great demand due to the improvement in mobile use of equipment. On the other hand, with the progress of a CMOS (Complementary MOS) process, in a design generation of such as 90 nm and 65 nm, off-leak electric current of the MOS transistor becomes large and power consumption thereof can not be ignored. To cope with the above consequence, the power supply has conventionally been cut off in a standby mode of operation where a clock is stopped using MT (Multi Threshold)-CMOS and others.

Patent document 1 discloses a sequence circuit that operates at high speed with low supply voltage, in which a stable and secure power down operation can be performed to reduce the power consumption. Further, Patent document 2 discloses a master-slave type flip-flop in which a function of reducing power consumption in a standby mode is provided and stored data is not lost in the standby mode.

Further, Patent document 3 discloses a semiconductor integrated circuit device including a MOS transistor, in which operation can be performed with low supply voltage in the active mode and the power consumption due to leaked electric current can be suppressed in the standby mode. Furthermore, Patent document 4 discloses an element in which the supply voltage is not applied at all to the devices other than a temporary memory element (a register element and memory, whose data is cleared when cutting off the supply voltage) in order to reduce the power consumption at the standby mode.

[Patent document 1] Japanese Published Patent Application No. H07-271477

[Patent document 2] Japanese Published Patent Application No. H11-284493

[Patent document 3] Japanese Published Patent Application No. 2000-208713

[Patent document 4] Japanese Published Patent Application No. 2001-251180

However, off-leak current is practically not able to be reduced in the active mode where the circuit is actually operating under the clock input.

Therefore, the purpose of the present invention is to provide a logic circuit, in which the off-leak electric current can be reduced in the active mode where the circuit is actually operating under the clock input; a semiconductor device that has a chip sealed in a package, on which the logic circuit is mounted; and further a logic processing apparatus including the semiconductor device as a component.

SUMMERY OF THE INVENTION

A logic processing apparatus according to the present invention is the apparatus including as a component a semiconductor device that has a chip sealed in a package, on which a logic circuit is mounted where data held in the front stage flip-flop is processed in a logic gate circuit network, and then the processed data is held in the rear stage flip-flop, the logic circuit including: flip-flops that hold data and the processed data synchronously with rising or falling of a clock signal at the front stage and rear stage respectively in the state in which the power is constantly supplied, and a logic gate circuit network as a combination circuit, which processes data held in the front stage flip-flop and outputs the processed data to the rear stage flip-flop in the state in which the power is supplied only during a predetermined period of time including rising or falling of the clock signal.

Accordingly, for example, if at the rising of a clock signal, data is held in the front stage flip-flop and the processed data from the logic gate circuit network is held in the rear stage flip-flop, data from the front stage flip-flop can only be processed during a low level period of time of the clock signal, that is, in the state in which the power is supplied to the logic gate circuit network only during the low level period of time, and in the case where the low level period of time is set as a somewhat longer period of time than the required minimum period of time (the sum of the processing delay time of the logic gate circuit network and the data set-up time of the rear stage flip-flop), off-leak electric current of the logic gate circuit network can be reduced greatly.

A logic circuit in which off-leak electric current can be reduced in the active mode where the circuit is actually operating under the clock input; a semiconductor device that has a chip sealed in a package on which the logic circuit is mounted; and a logic processing apparatus including the semiconductor device as a component, are provided.

BRIEF DESCRIPTION OF DRAWINGS

FIG. 4 shows an operational timing chart of FIG. 3;

BEST MODE FOR CARRYING OUT THE INVENTION

Hereinafter, embodiments of the present invention will be explained with reference to FIGS. 1 to 10.

Figure 1:
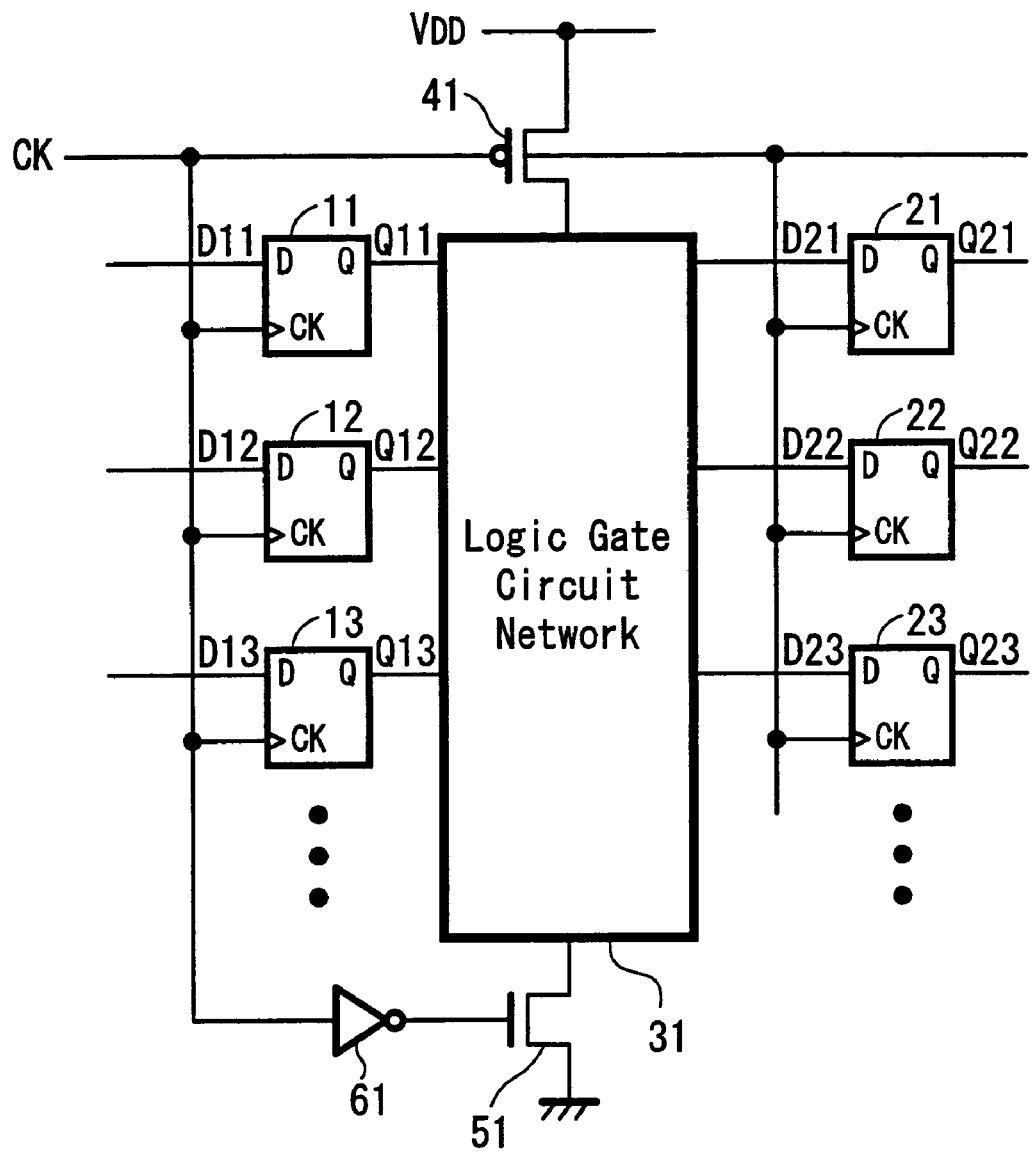
FIG. 1 shows an example of a basic configuration of a logic circuit according to the present invention.

First, a basic configuration of an example of a logic circuit according to the present invention is shown in FIG. 1. As shown in FIG. 1, while power supply voltage $V_{DD}$ is constantly applied to front stage flip-flops 11 to 13 and rear stage flip-flops 21 to 23, the supply voltage $V_{DD}$ can be applied to a logic gate circuit network 31 positioned therebetween through a P channel MOS transistor (hereinafter simply named p-MOS) 41 and an N channel MOS transistor (hereinafter simply named n-MOS) 51 as power supply cut-off Trs (Tr: transistor). With respect to the logic gate circuit network 31, the timing that the supply voltage $V_{DD}$ is applied depends on the state of the clock signal CK. In this embodiment, it is assumed that at the rising of the clock signal CK, data D11 to D13 from the outside and processed data D21 to D23 from the logic gate circuit network 31 are held (input) in the flip-flops 11 to 13 and 21 to 23, so that the supply voltage $V_{DD}$ is applied to the logic gate circuit network 31 during the low level period of time of the clock signal CK.

During a low level period of time of the clock signal CK, p-MOS 41 is in the ON state and n-MOS 51 is also in the ON state through an inverter 61, so that the logic gate circuit network 31 processes output data D11 to D13 held in the front stage flip-flops 11 to 13, and the processed data is also held in the rear stage flip-flops 11 to 13 at the next rising of the clock signal CK. Note that, though in this embodiment the power is supplied to the logic gate circuit network 31 through the p-MOS 41 and n-MOS 51, such configuration that either one may not be provided and ON/OFF control is performed on the other is also conceivable. In this embodiment a D type flip-flop of the rising edge (hereinafter simply named DFF) is assumed to be flip-flops 11 to 13 and 31 to 23; however, flip-flops of the falling edge, and other than those, JK master-slave type or other flip-flops can also be used.

Figure 2:
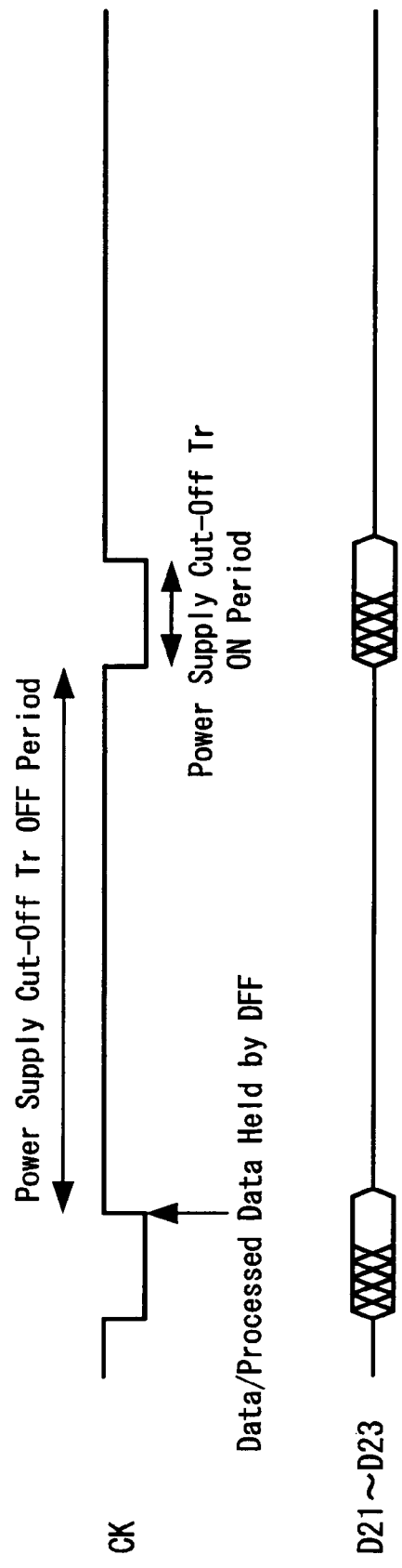
FIG. 2 shows an operational timing chart of FIG. 1.
Figure 3:
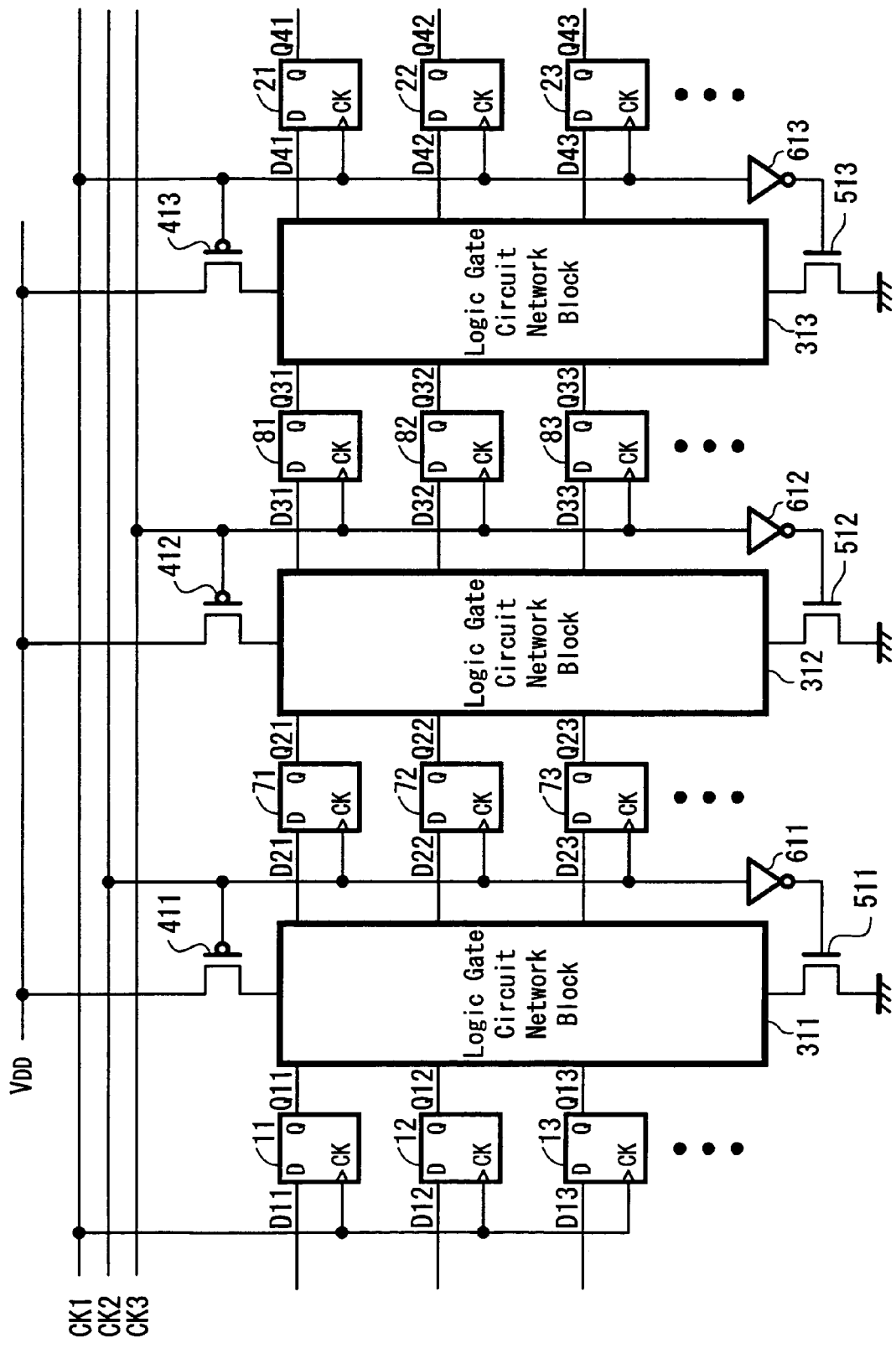
FIG. 3 shows another configuration of a logic circuit according to the present invention.

FIG. 2 shows an operational timing chart of the above mentioned logic circuit, and in this case, every time the clock signal CK rises, data D11 to D13 from the outside are held in DFFs 11 to 13. After waiting until the clock signal CK becomes the low level state, the held data D11 to D13 are subsequently processed at the logic gate network circuit 31. The processed data D21 to D23 from the logic gate network circuit 31 are also taken into DFFs 21 to 23 at the rising of the clock signal CK. Accordingly, every time the clock signal CK rises, data D11 to D13 are held in the DFFs 11 to 13, and, at the same time, the processed data D21 to D23 are held in the DFFs 21 to 23; and when data D11 to D13 are held in the DFFs 11 to 13, the processed data D21 to D23 are held in the DFFs 21 to 23 after one cycle of the clock signal CK. Hereupon, the mesh portion shown in the drawing indicates that the processed data D21 to D23 are in undecided states.

Therefore, since it is necessary to wait until the state of the processed data D21 to D23 become definite and then those are held in the DFFs 21 to 23, the low level period of time of the clock signal CK is set equal to or longer than the sum of the required processing time (processing delay time) in a logic gate circuit network 31 and the data setup time in the rear stage flop-flop. However, in accordance with the desired expected result of the present invention, namely, if off-leak electric current is made to reduce in the active mode where the circuit is actually operating under the clock input, the low level period of time of the clock signal CK is set to somewhat longer than the sum.

A basic configuration and its operation of a logic circuit are explained as described above; however, a configuration shown in FIG. 3 can also be conceivable. As shown in the drawing, the whole logic gate circuit network 31 already mentioned is divided into three blocks along the processing direction; and while two kinds of delayed clock signals CK2 and CK3 each having a different phase such as a shifted phase by $2\pi/3$, are generated from the clock signal CK1 that has the same frequency as the above described clock signal CK, intermediate stage DFFs 71 to 73 and 81 to 83 are newly provided between blocks of logic gate circuit networks 311 and 312, and between blocks of logic gate circuit networks 312 and 313, respectively. Also, p-MOSs 411 to 413, n-MOSs 511 to 513 and inverters 611 to 613 are disposed around the logic gate circuit network blocks 311 to 313 respectively as shown in the drawing, and the clock signals CK1 to CK3 are given thereto in a predetermined manner.

FIG. 4 shows an operational timing chart of the above described logic circuit, and in this case, data D11 to D13 from the outside are held in the DFFs 11 to 13 every time the clock signal CK1 rises. After waiting until the clock signal CK2 becomes the low level state, the held data D11 to D13 are processed in the logic gate network circuit block 311 and then, the (intermediate) processed data D21 to D23 are held in the DFFs 71 to 73 at the rising of the clock signal CK2. Further, after waiting until the clock signal CK3 becomes the low level state, the processed data held in the DFFs 71 to 73 are also processed in the logic gate network circuit block 312, and then, the (intermediate) processed data D31 to D33 are held in DFFs 81 to 83 at the rising of the clock signal CK3. The processed data held in the DFFs 81 to 83 are also processed in the logic gate network circuit block 313 after waiting until the clock signal CK1 becomes the low level state, and then, the (final) processed data D41 to D43 are held in the DFFs 21 to 23 at the rising of the clock signal CK1.

Consequently, every time the clock signal CK1 rises, data D11 to D13 are held in the DFFs 11 to 13, and, at the same time, the processed data D41 to D43 are held in the DFFs 21 to 23; thus, when data D11 to D13 are held in the DFFs 11 to 13, after one cycle of the clock signal CK, the processed data D41 to D43 are held in the DFFs 21 to 23. As described above, in the case where each of processing timing between the logic gate circuit network blocks 311 to 312 and processing timing between those of 312 to 313 is shifted, the amount of the rush current can be restrained in comparison with the configuration of FIG. 1. Also, each processing time required in the logic gate circuit network blocks 311 to 312 is conventionally not the same; however, if those are almost the same, each low level period of time of the clock signals CK1 to CK3 can be set as approximately the same period of time. Accordingly, this period of time is set shorter than that of the clock signal CK.

Figure 5A:
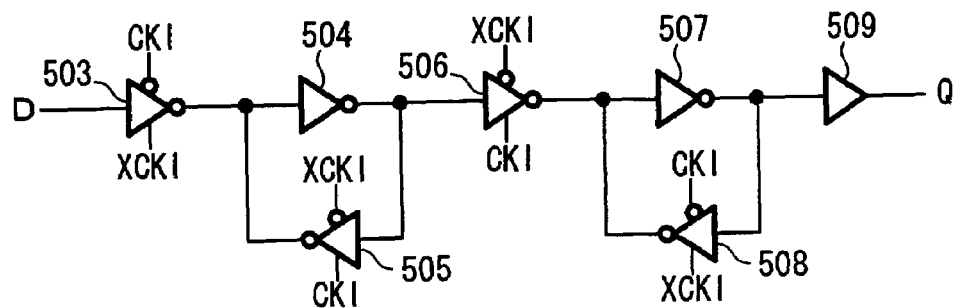
FIGS. 5A and 5B show an example of an inner configuration of a DFF (D type flip-flop)
Figure 5B:
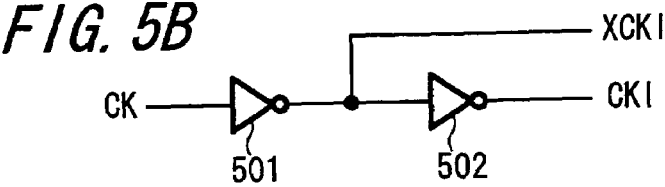
Figure 6A:
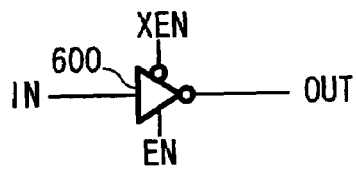
FIGS. 6A and 6B show a specific circuit configuration of a clocked-inverter.
Figure 6B:
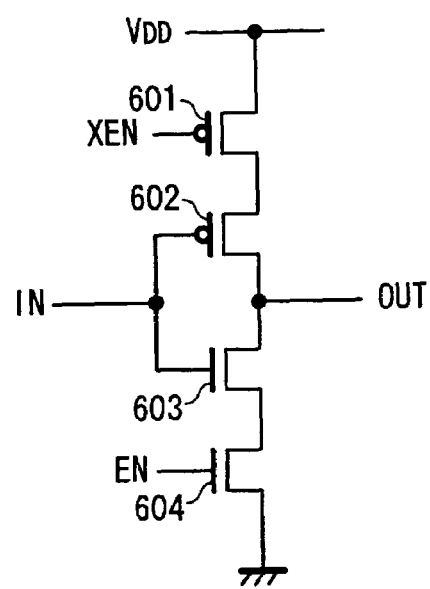

Here, to explain a DFF, an example of the inner structure is shown in FIG. 5A and the mutual relationships between the clock signal CK, CKI and XCKI for the clocked-inverter used as a component thereof is shown in FIG. 5B. Before explaining those drawings 5A and 5B, the clocked-inverter is first explained; FIG. 6A shows a symbol display, and FIG. 6B shows an example of a specific circuit configuration. Specifically, a clocked-inverter 600 shown in FIG. 6A has a series connection of a p-MOS 601, CMOS inverter (including p-MOS 602 and n-MOS 603), and n-MOS 604 between the supply voltage $V_{DD}$ and the ground potential, as shown in FIG. 6B, and only when the clock signals EN and XEN, which have an inverse phase relation to each other, are in the periods of the high level state and the low level state, respectively, the CMOS inverter can output an inversed input signal IN as an output signal with the low output impedance.

Returned to FIG. 5, the explanation regarding the DFF is continued; first, the mutual relationships between the clock signals CK, CKI and XCKI are shown in FIG. 5B. That is, the clock signal CK is inverted by an inverter 501 to obtain the clock signal XCKI, and the clock signal XCKI is also inverted by an inverter 502 to obtain the clock signal CKI. Consequently, the clock signals CK and CKI are obtained as almost the same ones.

Hereupon, to specifically explain the inner structure of the DFF, a clocked-inverter 503 is provided at an input stage, whereby only when the clock signal CKI is in the period of the low level state, an input signal D is inverted by the clocked-inverter 503, and then is inverted again by an inverter 504. Then, if the clock signal CKI becomes the high level state, the state of an input signal D immediately before transition is stored by the inverter 504 and a clocked-inverter 505. The stored state is obtained as Q output on the outside from a buffer gate 509 through a clocked-inverter 506 and an inverter 507, and the stored state is held in an inverter 507 and a clocked-inverter 508, even if the clock signal CKI subsequently becomes the low level state. Accordingly, at the rising of the clock signal CK, the state of an input signal D immediately before the rising is held in the DFF to be output. Therefore, within the period of time where the clock signal CK is in the high level state, even if uncertain input voltage is input from a logic gate circuit network and logic gate circuit network blocks to which no supply voltage is applied, both the p-MOS 601 and n-MOS 604 in the clocked-inverter 503 are in the OFF state, so that a piercing electric current is not generated at an input stage, and the power consumption can be reduced.

Figure 7:
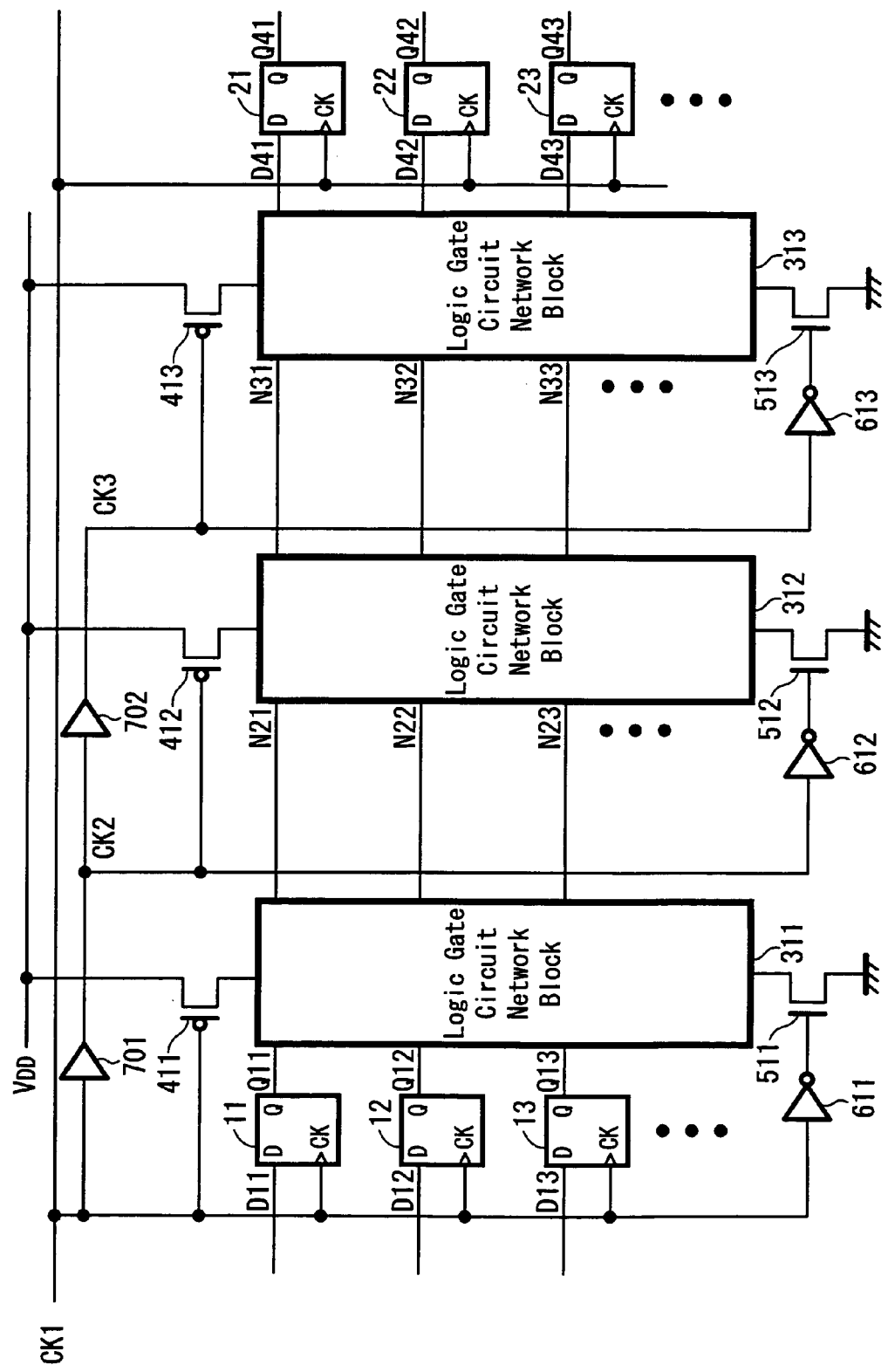
FIG. 7 shows further another configuration of a logic circuit according to the present invention.
Figure 8:
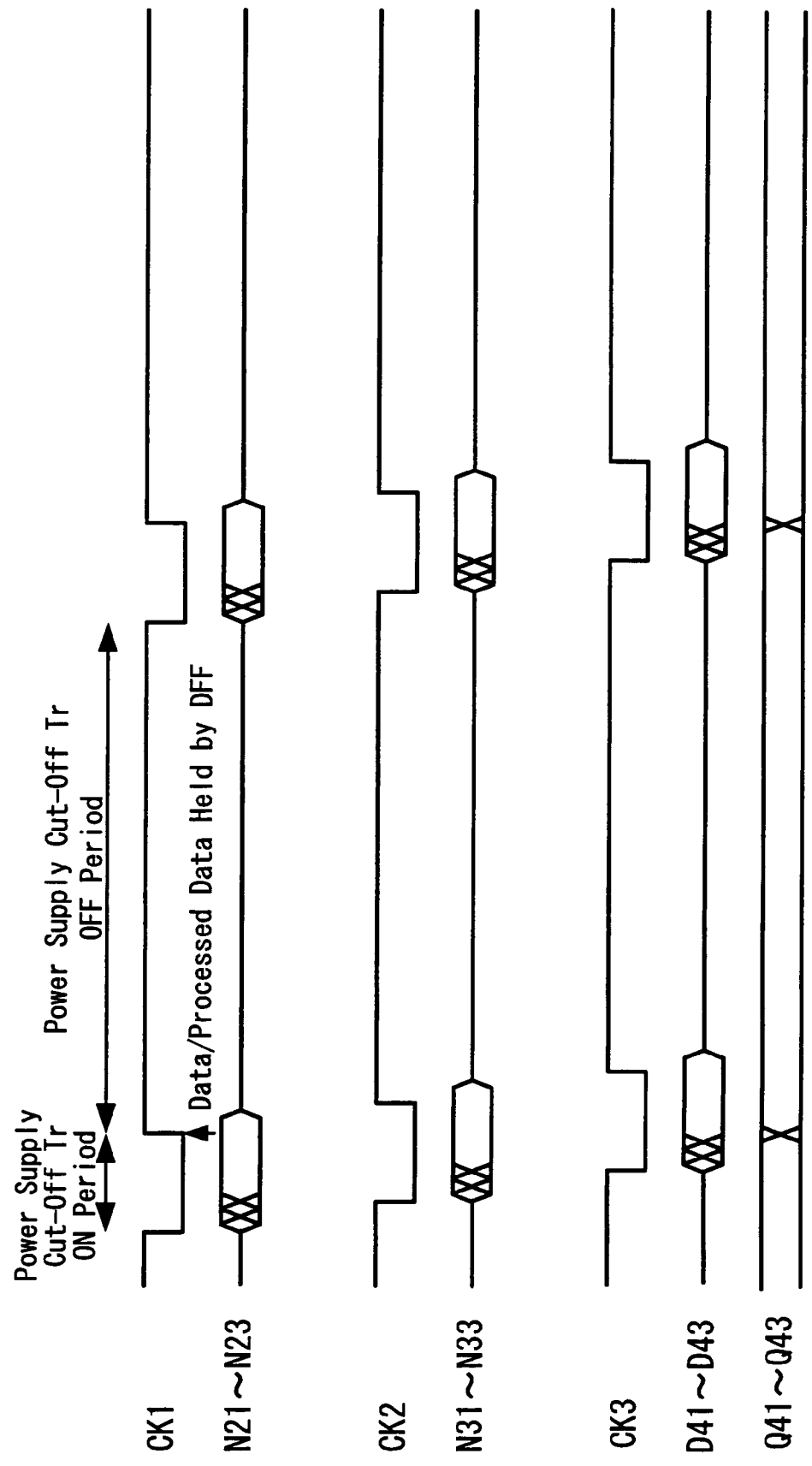
FIG. 8 shows an operational timing chart of FIG. 7.

Furthermore, to explain still another configuration of a logic circuit, FIG. 7 shows the configuration and FIG. 8 shows an operational timing chart thereof. As shown in FIG. 7, in order that a part of the low level period is overlapped with each other, the clock signal CK1 having the same frequency as the clock signal CK1 in FIG. 3 sequentially passes through delayed gates 701 and 702 to form delayed clock signals CK2 and CK3 that are shifted by some from the clock signal CK1; and by each of these clock signals CK1, CK2 and CK3, the logic gate circuit network blocks 311, 312 and 313 are sequentially brought into the state in which processing can be performed. Consequently, similarly to the case of FIG. 1, if the data D11 to D13 are held in the DFFs 11 to 13 at the rising of the clock signal CK1, after one cycle of the clock signal CK1, the processed data D41 to D43 are to be held in the DFFs 21 to 23. The reason why such power supply method is employed differently from the case of FIG. 1 is that, when it is assumed that the supply voltage is applied to the logic gate circuit network blocks 311, 312 and 313 concurrently, the stable condition as the circuit is conventionally started from a first stage of the logic gate circuit network block 311, and gradually moved to the final stage of the logic gate circuit network block 313; therefore, the supply voltage is unnecessary regarding a part of circuit that has already been in sufficiently stable condition and a part of circuit that has enough time to start the processing, and thus, off-leak electric current can be reduced compared to the one shown in FIG. 1.

Figure 9:
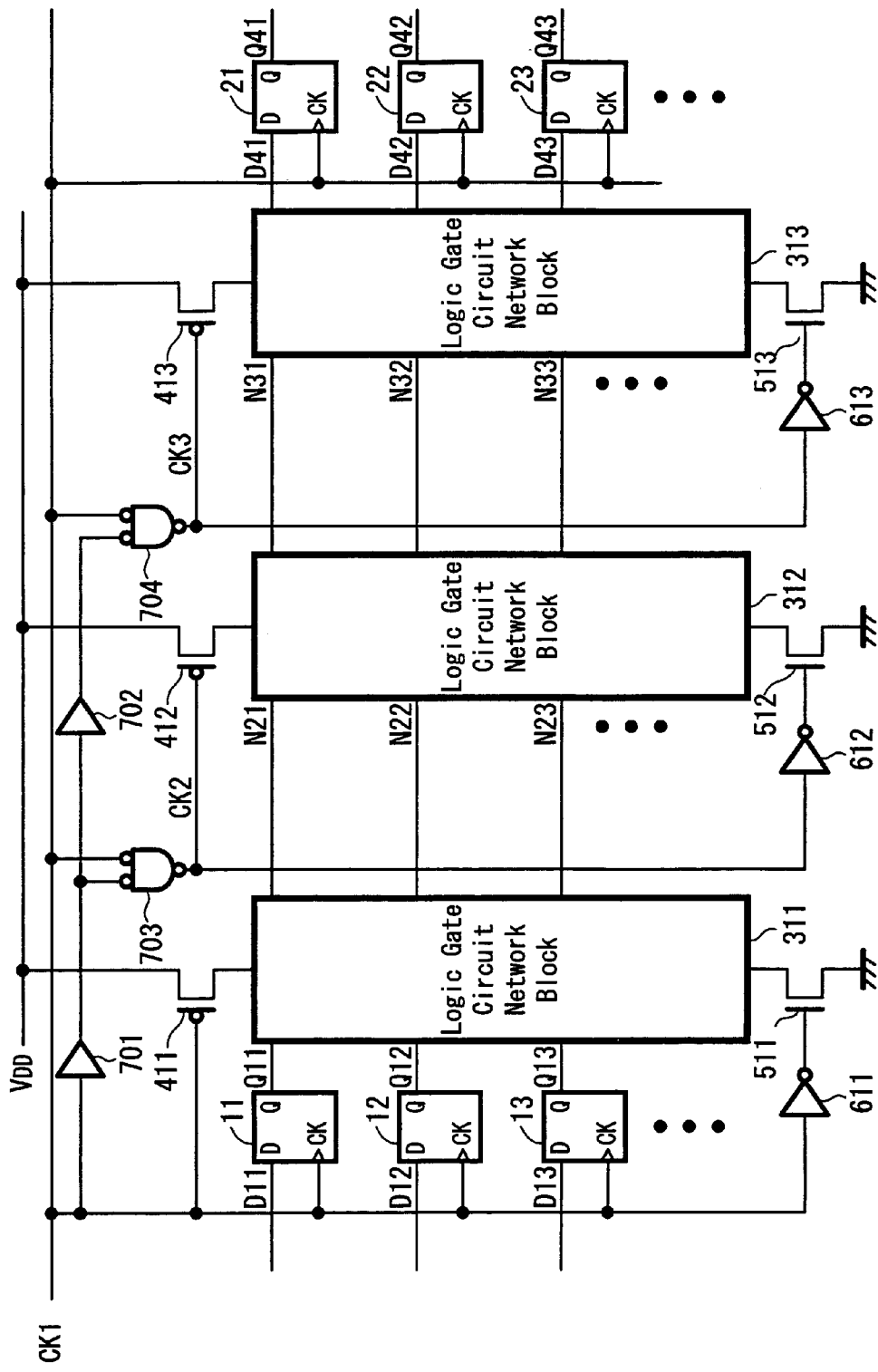
FIG. 9 shows still another configuration of a logic circuit according to the present invention.
Figure 10:
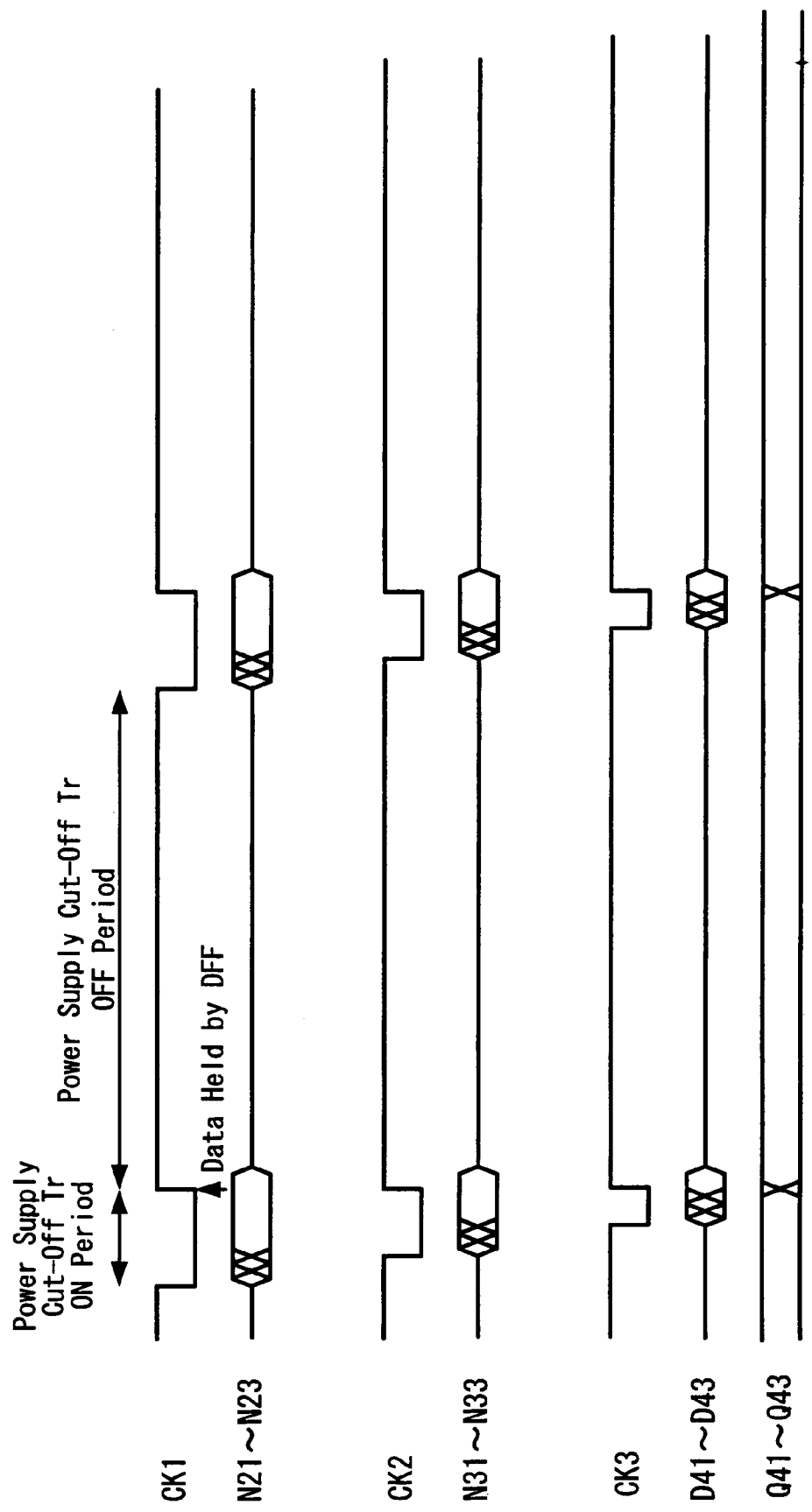
FIG. 10 shows an operational timing chart of FIG. 9.

To explain still further another configuration of the logic circuit, FIG. 9 shows the configuration and FIG. 10 shows an operational timing chart thereof. As shown in FIG. 9, though the whole configuration is almost the same as that shown in FIG. 7, the low level period of time of each of the clock signals CK2 and CK3 is set shorter than those of FIG. 7. Specifically, in the configuration shown in FIG. 7, the clock signals CK2 and CK3 are obtained directly from the delayed gates 701 and 702, respectively; however in FIG. 9, the clock signals CK2 and CK3 are newly obtained from a 2-input negative NAND gate (its function is equal to a 2-input OR gate) in which one input is the clock signals CK2 and CK3 and the other input is the clock signal CK1 respectively; and consequently, the low level period of time is set shorter compared with the clock signals CK2 and CK3 in FIG. 7, and also, the end timing of the low level period of the clock signal CK3 is set to coincide with the rising of the clock signal CK1. Therefore, off-leak electric current can further be reduced compared with the configuration shown in FIG. 7.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A logic processing apparatus including as a component a semiconductor device that has a chip sealed in a package, on which a logic circuit is mounted where data held in the front stage flip-flop is processed at a logic gate circuit network and then the processed data is held in the rear stage flip-flop, the logic circuit comprising:
    flip-flops that hold data and processed data synchronously with rising or falling of a clock signal at the front stage and rear stage, respectively, in a state in which the power is constantly supplied;
    a logic gate circuit network, which processes data held in the front stage flip-flop and outputs the processed data to the rear stage flip-flop, in a state in which the power is supplied only during a predetermined period of time including rising or falling of said clock signal;
    wherein, when said logic gate circuit network is divided into n (n: an integer of two or more) blocks along the processing direction, while (n−1) kinds of delayed clock signal each having a different phase from said clock signal are generated, intermediate stage flip-flops are disposed between n blocks of logic gate circuit networks, respectively; said clock signal is supplied as a clock signal to the front stage flip-flop and rear stage flip-flop; power is supplied to the final stage logic gate circuit network block by the clock signal; and each of said (n−1) kinds of delayed clock signal is supplied as a clock signal to a corresponding intermediate stage flip-flop and a power is sequentially supplied to the corresponding block of logic gate circuit network except the final block by the delayed clock signal.

2. A logic processing apparatus including as a component a semiconductor device that has a chip sealed in a package, on which a logic circuit is mounted where data held in the front stage flip-flop is processed at a logic gate circuit network and then the processed data is held in the rear stage flip-flop, the logic circuit comprising:
    flip-flops that hold data and processed data synchronously with rising or falling of a clock signal at the front stage and rear stage, respectively, in a state in which the power is constantly supplied;
    a logic gate circuit network, which processes data held in the front stage flip-flop and outputs the processed data to the rear stage flip-flop, in a state in which the power is supplied only during a predetermined period of time including rising or falling of said clock signal;
    wherein, when said logic gate circuit network is divided into n (n: integer of two or more) blocks along the processing direction, (n−1) kinds of delayed clock signal each having a phase somewhat shifted from said clock signal are generated to make a part of the predetermined period of time including rising or falling overlap with each other, and the power is sequentially supplied to each of the n blocks of logic gate circuit network by the delayed clock signals and said clock signal.

3. A logic processing apparatus according to claim 2, wherein when (n−1) kinds of delayed clock signal each having a phase somewhat shifted from said clock signal are generated to make the predetermined period of time including rising or falling of said clock signal overlap with each other, said predetermined period of time including rising or falling of the delayed clock signal is set to a shorter period of time in accordance with the increase of a delay time.

* * * * *